US005702790A

United States Patent [19]

Liebe, Jr.

[11] Patent Number: 5,702,790

[45] Date of Patent: Dec. 30, 1997

[54] WATER-ADDED EVAPORATION PROCESS FOR MAKING THIN PLASTIC LETTERING WEBS

[76] Inventor: Robert James Liebe, Jr., 1577 Kehrs Mill Rd., Chesterfield, Mo. 63005

[21] Appl. No.: 513,388

[22] Filed: Aug. 10, 1995

Related U.S. Application Data

[63] Continuation-in-part of Ser. No. 134,184, Oct. 8, 1993, Pat. No. 5,441,785, which is a continuation-in-part of Ser. No. 856,128, Mar. 23, 1992, abandoned, which is a continuation-in-part of Ser. No. 636,877, Jan. 2, 1991, Pat. No. 5,112,423.

[51] Int. Cl.[6] ........................................ B32B 9/00

[52] U.S. Cl. ........................ 428/46; 428/40.2; 428/41.5; 428/43; 428/195; 428/207; 428/212; 428/346; 428/914; 156/234; 156/247; 156/257; 156/264; 156/267

[58] Field of Search ........................ 428/40.2, 41.3, 428/41.5, 43, 46, 216, 212, 207, 200, 195, 346, 343, 347, 348, 352, 914, 354; 156/230, 236, 238, 239, 234, 247, 257, 264, 267; 524/839, 591

[56] References Cited

U.S. PATENT DOCUMENTS

| | | | |
|---|---|---|---|
| 5,095,069 | 3/1992 | Ambrose et al. | 524/591 |
| 5,312,645 | 5/1994 | Dressler . | |
| 5,441,785 | 8/1995 | Liebe, Jr. | 428/41 |

*Primary Examiner*—Patrick Ryan

*Assistant Examiner*—Abraham Bahta

*Attorney, Agent, or Firm*—Armstrong, Teasdale, Schlafly and Davis

[57] ABSTRACT

A water-evaporation process for making thin one-color plastic lettering, as used in sets for computer-cutting and application in spaced array. Water-based plastics, particularly urethanes and acrylics are used instead of polyvinyl chloride. These more flexible films are opaque, resulting from use of large amounts of water-dispersed pigments. After spreading, the water is evaporated, causing the spread mixture to coalesce into a thin tough well-pigmented opaque film. Films less than two mils thick may be formed, free from migratory plasticizers which might cause pigments to migrate or to damage adjacent the flanking layers of adhesives and release films. The water evaporation process, at only about 220° F., requires minimal workplace or environmental safeguards compared to the use of solvent containing systems.

5 Claims, No Drawings

WATER-ADDED EVAPORATION PROCESS FOR MAKING THIN PLASTIC LETTERING WEBS

CROSS-REFERENCE TO RELATED APPLICATIONS

This application is a continuation-in-part of application Ser. No. 08/134,184, filed Oct. 8, 1993, entitled "Composite Alignment-Maintaining Plastic Lettering Material", pending, to issue Aug. 15, 1995 as U.S. Pat. No. 5,441,785, a continuation-in-part of application Ser. No. 07/856,128, filed Mar. 23, 1992, entitled "Alignment-Maintaining Plastic Lettering Material", abandoned, which was a continuation-in-part of application Ser. No. 07/636,877, filed Jan. 2, 1991, entitled "Method of Making and Applying Alignment-Maintaining Plastic Lettering Material", issued May 12, 1992 as U.S. Pat. No. 5,112,423.

This invention relates to using water-based polymers to make thin adhesive-backed pigmented plastic lettering webs for computer-cutting of lettering groups or signs, for position mounting by an included transparent release sheet.

BACKGROUND OF THE INVENTION

Lettering sets, including a pigmented plastic layer backed by an adhesive layer, to be computer-cut and retained in position on a transparent strippable release sheet, are familiarly used for applying athletes' names to their woven garments. Prior art three-layer lettering sets, using a pigmented polyvinyl chloride plastic lettering sheet backed by a sheet of adhesive and having a transparent front release sheet (which aids in positioning on garments or other substrates) are shown in my U.S. Pat. No. 5,112,423 and application Ser. No. 08/134,184 (to issue Aug. 15, 1995 as U.S. Pat. No. 5,441,785). In this prior art form, outlines of lettering elements in mirror-image are cut starting through the adhesive sheet and through the lettering sheet, to (and sometimes into but not through) the release sheet.

In another prior art form, lettering sets for the same purpose are made of pigmented polyvinyl chloride with an adhesive backing sheet but without the paper forward sheet on which the PVC was originally cast; the cutting proceeds in direct (not mirror-image) order, first through the pigmented layer and then through the adhesive layer. After the portion between the lettering outlines have been removed, a handling sheet (preferably a transparent film whose of surface is somewhat adherent) is pressed against the forward side of the lettering elements so cut, to lift them and position them in place on the garment or other substrate.

Polyvinyl chloride material (hereinafter called "PVC") is inexpensive compared to water-based aliphatic urethane polymer; a factor heretofore given great importance since the greater part of such lettering sheets is discarded after cutting the lettering from them. Available both as a plastisols and organisols, PVC's require temperatures of 320° F. to form a film.

U.S. Pat. No. 5,312,645 suggests that a solvent-based polyurethane may be substituted for polyvinyl chloride to gain somewhat improved tensile strength, abrasion-resistance and capacity for elongation, for processing at the same temperature of solvent evaporation.

SUMMARY OF THE INVENTION

According to the present invention, a water-based (not solvent-based) aliphatic urethane polymer, which may have an admixture of water-based acrylic, is used in lettering sheets which may be substantially thinner than those of PVC. At the water-evaporation temperature, the mixed ingredients coalesce to form a very thin, intensely pigmented film of great strength and flexibility, as well as superb surface coloration.

Initially a fairly stiff mixture is prepared of a water-based aliphatic urethane in water, or acrylic emulsions in water, water-dispersed pigments, a coalescing agent, and other ingredients hereinafter set forth and known in the art. To this mixture is added water for liquidity and a viscosity-modifier to afford to the liquid sufficient viscosity to retain the thickness at which it is machine-spread.

After setting the spreading blade at a desired height (as hereinafter explained), the mixture is spread on a casting sheet, preferably transparent or translucent, which will serve as the release sheet of lettering sets to be formed. Then, by a heated-air atmosphere of say 220° F., all water is evaporated, causing the spread layer to shrink to a thin dry film in which the plastic ingredients have coalesced, incorporating the pigment and other non-plastic ingredients. The final steps are to add an adhesive layer appropriate for the ultimate use to be made.

DESCRIPTION OF THE PREFERRED EMBODIMENT

The pigmented display layer used in the preferred embodiment is of the following composition:

| | |
|---|---|
| Aliphatic polyurethane in water (34% solids) | 53% by weight |
| Acrylic emulsion in water (40% solids) | 7% by weight |
| Water-dispersed pigment (20–70% solids) | 33% by weight |
| Polyacrylate viscosity modifier | 4% by weight |
| Anti-foam additive | 1% by weight |
| Flow and leveling additive | 1% by weight |
| Anti-mar and release agent | 1% by weight |

A water based coating compound is prepared with the appropriate level of pigmentation to achieve opacity at the desired dry film thickness. It is rendered liquid by the addition of water, and is then adjusted to a coatable viscosity by the addition of viscosity modifiers.

To make a film of a chosen thickness, set the spreading blade at the height over a casting sheet determined by the volume of solids in the coating composition; that is:

$$\frac{\text{Spread depth}}{\text{chosen thickness}} = \frac{\text{volume ingredients plus added water}}{\text{dry volume of ingredients}}$$

After spreading, convey to an atmosphere whose temperature is between 220°–240° F., causing the water to evaporate to yield a film of desired thickness casting sheet.

Then, applying onto the surface opposite the casting sheet a layer of pre-formed pressure-sensitive adhesive with a paper backing yields a four-layer lettering assembly for computerized cutting.

If desired, instead of using any water-based acrylic, 60% of water-based polyurethane may be used, resulting in a more flexible product.

In addition to the obvious advantages of evaporating water at 220° F., the present uses of water-based urethanes and acrylics have at least the following significant advantages over prior-known systems:

Because there is neither a high fusion temperature nor any use of solvents, a greater choice of casting sheets is afforded; for example, casting sheets such as flexible PVC may be used which could not withstand high temperatures or solvents. Dispersion in water before spreading permits higher pigment concentrations.

Since no migratory plasticizer is used, this avoids the potential of degradation of some types of casting sheets and adhesives through plasticizer migration, and eliminates the potential for migration of pigments, allowing greater latitude in selection of these components.

The low temperature at which the water is evaporated from the spread mixture is of importance also in that is permits casting on very thin flexible transparent plastic sheets which could not withstand substantially higher temperatures. Using such delicate sheets makes possible the new use of lettering sets on corrugated or even sharply-angled substrates, such as metal truck bodies which have angular bends or other sharply angled portions. For these uses, release sheets selected should be thin and as flexible as possible.

If webs on hand have release sheets too firm or too flexible for an intended use, such release sheets may be stripped off. Then, release sheets of desired flexibility or firmness may be pressed in place on the surface of the pigmented layer.

In my prior patents above referred to, stress is laid on inclusion of some degree of carboxylation in the pigmented layer. In using transparent release sheets obtained from a variety of sources, some sheets will provide sufficient support for cut lettering without such display layer inclusion of partial carboxylation; applicant has no way of learning whether such support comes from the composition of the sheets or from their surface finishes or textures. For this reason, the instructions herein for formulating urethane and acrylic mixtures should be understood to include such carboxlyation where user-chosen release sheets will not otherwise serve.

As various modifications may be made in the procedures herein described without departing from the scope of the invention, it is intended that all matter contained in the foregoing description shall be taken as illustrative rather than limiting.

I claim:

1. For use as thin flexible signage-lettering material adapted for computerized cutting, the process of making a pigmented display layer, comprising the steps of:

mixing water-based polymers of polyurethane or acrylic composition, or mixtures thereof, with water-soluble or water-dispersible pigment and functional additives in a predetermined quantity to form a substantially non-flowing mixture, together with such amount of water as renders the resultant mixture substantially fluid and such amount of viscosity-increasing agent as makes it machine-spreadable, then machine-spreading such resultant mixture on a transparent release sheet or preliminary foundation sheet at such spread depth as will, on subsequent drying, shrink, coalesce and harden to a chosen film thickness, such machine spread depth being determined according to the equation $$\frac{\text{Spread depth}}{\text{chosen thickness}} = \frac{\text{volume ingredients plus added water}}{\text{dry volume of ingredients}}$$

and evaporating all water therefrom, whereby to shrink and coalesce the mixture into a thin, pigmented polymer display layer on such foundation sheet or release sheet, and by such coalesce, to cause preliminary adherence to a sheet, all without substantially exceeding the evaporation temperature of water.

2. The process as defined in claim 1 wherein the functional additives are dispersents.

3. The process as defined in claim 1 wherein the functional additives are wetting agents.

4. The process as defined in claim 1 wherein the functional additives are flow control additives.

5. The process as defined in claim 1 wherein the functional additives are anti-foam additives.

* * * * *